(12) United States Patent
Walton et al.

(10) Patent No.: US 11,614,748 B2
(45) Date of Patent: *Mar. 28, 2023

(54) MATERIALS HANDLING VEHICLE OPERATING SYSTEM COMPRISING REMEDIAL INDICATOR TAGS

(71) Applicant: Crown Equipment Corporation, New Bremen, OH (US)

(72) Inventors: Daniel Douglas Walton, Marysville, OH (US); Aaron Louis Williams, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/021,329

(22) Filed: Sep. 15, 2020

(65) Prior Publication Data

US 2020/0409390 A1 Dec. 31, 2020

Related U.S. Application Data

(63) Continuation of application No. 16/202,385, filed on Nov. 28, 2018, now Pat. No. 10,824,164.

(Continued)

(51) Int. Cl.
*G05D 1/00* (2006.01)
*G05D 1/02* (2020.01)
(Continued)

(52) U.S. Cl.
CPC .............. *G05D 1/0276* (2013.01); *B66F 9/06* (2013.01); *B66F 9/063* (2013.01); *B66F 9/0755* (2013.01);
(Continued)

(58) Field of Classification Search
CPC .. G05D 1/0276; G05D 1/0055; G05D 1/0088; G05D 1/02; G05D 1/0261;
(Continued)

(56) References Cited

U.S. PATENT DOCUMENTS 6,496,806 B1 * 12/2002 Horwitz ............... G06Q 10/087
705/28
8,108,989 B2    2/2012 Muhlenkamp et al.
(Continued)

FOREIGN PATENT DOCUMENTS

WO    2016179532 A1    11/2016

OTHER PUBLICATIONS

International Search Report and Written Opinion for International Application No. PCT/US2018/062792 dated Feb. 18, 2019.

*Primary Examiner* — Thomas Randazzo
(74) *Attorney, Agent, or Firm* — Dinsmore & Shohl, LLP

(57) ABSTRACT

A materials handling vehicle operating system is provided comprising a tag layout where a plurality of entry/exit tag sets are arranged along a travel path at different ones of the entry/exit thresholds of a restricted navigation zone. Each entry/exit tag set comprises a release tag, a restriction tag, and an indicator tag. The indicator tag is positioned between the restriction tag and the restricted navigation zone. The restriction tag is positioned between the release tag and the indicator tag. The tag reader and the reader module cooperate to compare identified tag data with stored tag data and initiate a remediation operation when an indicator tag is identified in place of a restriction tag. Tag layouts for one-way and two-way travel into and out of a restricted navigation zone are also contemplated.

21 Claims, 3 Drawing Sheets

Related U.S. Application Data

(60) Provisional application No. 62/592,123, filed on Nov. 29, 2017.

(51) Int. Cl.

| | | |
|---|---|---|
| *B66F 9/06* | (2006.01) | |
| *B66F 9/075* | (2006.01) | |
| *B66F 9/24* | (2006.01) | |
| *G06K 7/00* | (2006.01) | |
| *G06K 7/10* | (2006.01) | |
| *G06K 19/07* | (2006.01) | |

(52) U.S. Cl.
CPC .............. *B66F 9/24* (2013.01); *G05D 1/0055* (2013.01); *G05D 1/0088* (2013.01); *G05D 1/02* (2013.01); *G05D 1/028* (2013.01); *G05D 1/0261* (2013.01); *G05D 1/0291* (2013.01); *G06K 7/00* (2013.01); *G06K 7/10009* (2013.01); *G06K 19/0723* (2013.01); *G05D 2201/0216* (2013.01)

(58) Field of Classification Search
CPC .................. G05D 1/028; G05D 1/0291; G05D 2201/0216; B66F 9/06; B66F 9/063; B66F 9/0755; B66F 9/24; G06K 7/00; G06K 7/10009; G06K 19/0723
See application file for complete search history.

(56) References Cited

U.S. PATENT DOCUMENTS

| | | | |
|---|---|---|---|
| 8,193,903 | B2 | 6/2012 | Kraimer et al. |
| 8,239,251 | B2 | 8/2012 | Wellman |
| 8,970,363 | B2 | 3/2015 | Kraimer et al. |
| 9,082,293 | B2 | 7/2015 | Wellman et al. |
| 9,658,622 | B2* | 5/2017 | Walton .................. G01C 21/00 |
| 9,811,088 | B2 | 11/2017 | Walton et al. |
| 9,818,003 | B2 | 11/2017 | Steinbrunner et al. |
| 10,146,229 | B2* | 12/2018 | Walton .................. G06Q 10/00 |
| 10,824,164 | B2* | 11/2020 | Walton .................. B66F 9/0755 |
| 2010/0039247 | A1 | 2/2010 | Ziegler et al. |
| 2016/0327951 | A1* | 11/2016 | Walton .................. G06Q 10/00 |
| 2016/0327952 | A1* | 11/2016 | Walton .................. G06Q 10/00 |
| 2016/0327955 | A1* | 11/2016 | Walton .................. G01C 21/00 |
| 2018/0039799 | A1 | 2/2018 | Steinbrunner et al. |
| 2018/0143638 | A1* | 5/2018 | Walton .................. G05D 1/021 |
| 2018/0276909 | A1 | 9/2018 | Harshbarger et al. |

* cited by examiner

MATERIALS HANDLING VEHICLE OPERATING SYSTEM COMPRISING REMEDIAL INDICATOR TAGS

CROSS-REFERENCE TO RELATED APPLICATIONS

This application claims priority to currently pending patent application Ser. No. 16/202,385 filed Nov. 28, 2018, which claims the benefit of Provisional Patent Application Ser. No. 62/592,123 filed Nov. 29, 2017.

BACKGROUND

The present disclosure relates to materials handling vehicle operation and, more particularly, to materials handling vehicle operating systems that are equipped for restricted operation in restricted zones of a warehouse. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where multi-level warehouse racks are arranged in aisles, and manufacturing facilities where goods are transported about the facility by materials handling vehicles for use in one or more manufacturing processes.

The present disclosure relates more particularly to optimizing the use of radio frequency identification tags (RFID tags), or other conventional or yet-to-be developed readable-tag technology, in a tag layout to assist with vehicle navigation in a warehouse. For example, and not by way of limitation, U.S. Pat. No. 9,658,622 and US PG Pub. No. 2016/0327952, describe the use of tags in various locations in a tag layout to affect vehicle navigation in the warehouse.

BRIEF SUMMARY

According to the subject matter of the present disclosure, a materials handling vehicle operating system is provided where remedial indicator tags are introduced to address tag reading or sensing errors, potential tag failure, and potentially missing tags in a tag layout of a materials handling vehicle operating system.

In accordance with one embodiment of the present disclosure, a materials handling vehicle operating system is provided comprising a materials handling vehicle, a tag layout, a tag reader residing on the materials handling vehicle, a reader module, and a vehicle controller. The tag layout comprises a plurality of sequenced tags positioned along a travel path comprising a restricted navigation zone. The restricted navigation zone comprises a plurality of entry/exit thresholds along the travel path. The sequenced tags comprise a plurality of entry/exit tag sets arranged along the travel path at different ones of the entry/exit thresholds of the restricted navigation zone. Each entry/exit tag set of the plurality of entry/exit tag sets comprises a release tag, a restriction tag, and an indicator tag. The indicator tag is positioned between the restriction tag and the restricted navigation zone along the travel path. The restriction tag is positioned between the release tag and the indicator tag along the travel path. The tag reader and the reader module cooperate to identify the release tags, the restriction tags, and the indicator tags of the sequenced tags of the tag layout. The vehicle controller executes restricted or unrestricted operational functionality of the materials handling vehicle in accordance with the identification of restriction tags and release tags along the travel path by the tag reader and the reader module. The tag reader and the reader module further cooperate to compare identified tag data with stored tag data and initiate a remediation operation when an indicator tag is identified in place of a restriction tag according to a sequenced portion of the stored tag data.

In accordance with another embodiment of the present disclosure, a materials handling vehicle operating system is provided where the restricted navigation zone comprises an entry threshold and an exit threshold along the travel path and the sequenced tags comprises an entry tag set arranged along the travel path at the entry threshold of the restricted travel zone and an exit tag set arranged along the travel path at the exit threshold of the restricted navigation zone. The entry tag set comprises a restriction tag and an indicator tag. The exit tag set comprises a release tag. The indicator tag is positioned between the restriction tag and the restricted navigation zone along the travel path and the restricted navigation zone is positioned between the indicator tag and the release tag along the travel path. The tag reader and the reader module cooperate to initiate a remediation operation when an indicator tag is identified in place of a restriction tag.

Tag layouts for one-way and two-way travel into and out of a restricted navigation zone are also contemplated.

Although the concepts of the present disclosure are described herein with primary reference to RFID tags, it is contemplated that the concepts will enjoy applicability to any technology that enables passive or active tags, arranged in a warehouse in a particular layout, and carrying or conveying specific identifying information, to be detected and read by a materials handling vehicle navigating through the warehouse.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
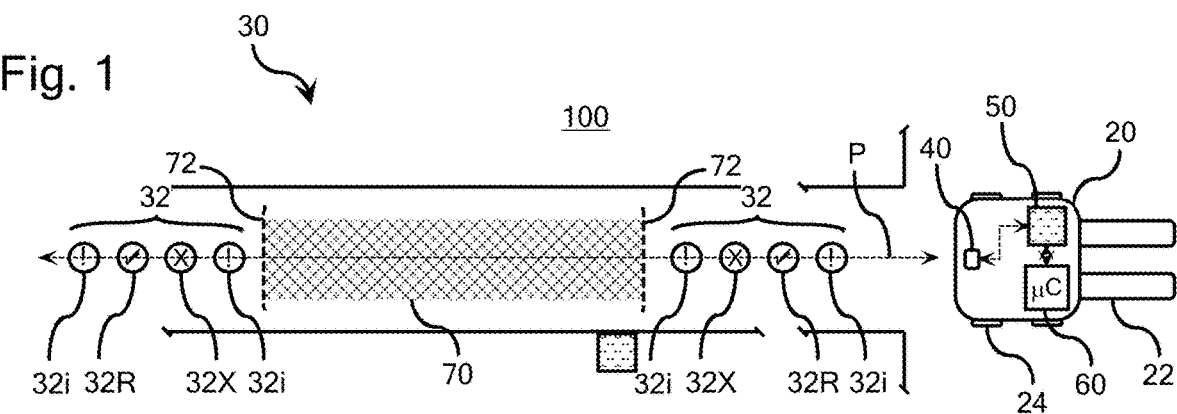
FIGS. 1-4 illustrate materials handling vehicle operating systems according to several alternative embodiments of the present disclosure.

Referring initially to FIG. 1, a materials handling vehicle operating system 100 according to one embodiment of the present disclosure is provided comprising a materials handling vehicle 20, a tag layout 30, a tag reader 40 residing on the materials handling vehicle 20, a reader module 50, and a vehicle controller 60. The materials handling vehicle 20 comprises storage and retrieval hardware 22 and a vehicle drive mechanism 24. As is illustrated schematically in FIG. 1, the materials handling vehicle 20 may comprise a conventional or yet-to-be developed autonomous or semi-autonomous materials handling vehicle or, more specifically, a forklift comprising conventional or yet-to-be developed lifting forks, drive train, and forklift wheels suited for travel in a warehouse environment.

Figure 2:
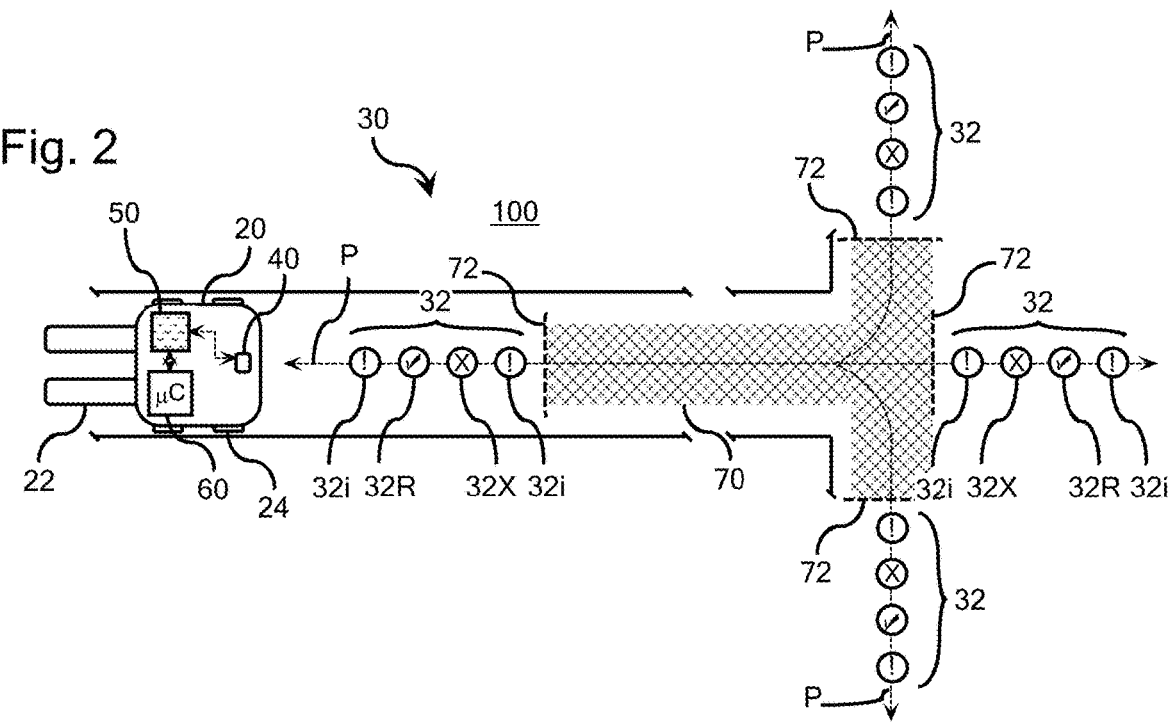
Figure 4:
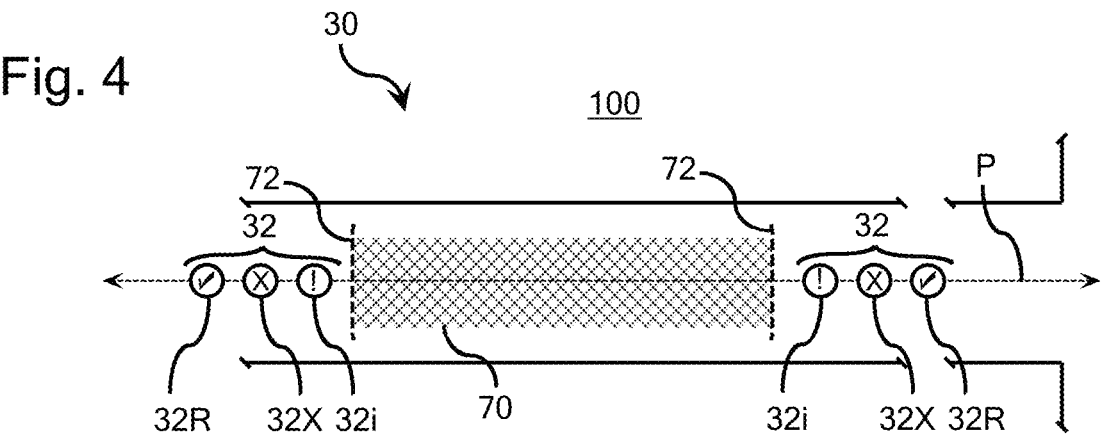

FIGS. 1, 2 and 4 illustrate alternative tag layouts 30, each comprising a plurality of sequenced tags. The tags are positioned along one or more travel paths P, which comprise a restricted navigation zone 70. The restricted navigation zone 70 may be a relatively simple linear travel zone with opposed entry/exit thresholds 72, as is illustrated in FIGS. 1 and 4, or a more complex restricted navigation zone 70 with more than two entry/exit thresholds 72 and one or more different curved or linear travel paths P, as is illustrated in FIG. 2. The sequenced tags, which are described in detail below with reference to the plurality of entry/exit tag sets 32, can be secured to or embedded in the warehouse floor and can be configured to provide identification data to the tag reader 40 and reader module 50 passively or actively. For example, and not by way of limitation, the sequenced tags may comprise passive or active RFID tags and, in many cases will only be distinguishable only by the tag identification data that they carry.

Each restricted navigation zone 70 illustrated in FIGS. 1, 2, and 4 comprises a plurality of entry/exit thresholds 72 along a travel path P. Entry/exit tag sets 32 are arranged along the travel path P at different ones of the entry/exit thresholds 72. Each entry/exit tag set 32 comprises a release tag 32R, a restriction tag 32X, and one or more indicator tags 32$i$. The indicator tags 32$i$ are positioned between the restriction tag 32X and the restricted navigation zone 70 along the travel path (P). Similarly, the restriction tag 32X is positioned between the release tag 32R and the indicator tag 32$i$ along the travel path P. In this manner, a materials handling vehicle 20 approaching the restricted navigation zone 70 will encounter the same ordered succession of tags regardless of which entry/exit threshold 72 is to be crossed in the approach. Similarly, a materials handling vehicle 20 leaving the restricted navigation zone 70 will encounter the same ordered succession of tags regardless of which entry/exit threshold 72 is to be crossed on departure.

The aforementioned predictable ordered succession of sequenced tags provides a means by which the functionality of the aforementioned sequenced tags can be enhanced by associating an indicator tag with a restriction tag or, as is described in further detail below, with a release tag. Generally, the indicator tag provides a means by which the location of the materials handling vehicle within the tag layout can be identified and acts as a failsafe if one of the sequenced tags is missing or misread, or fails to function correctly. The indicator tags can be used to generate a missing/malfunctioning tag signal, and can be used to ensure that appropriate commands are carried out even if there is a missing or malfunctioning tag.

More specifically, the tag reader 40 and the reader module 50 cooperate to identify the release tags 32R, the restriction tags 32X, and the indicator tags 32$i$ of the sequenced tags of the tag layout 30. The vehicle controller 60 executes restricted or unrestricted operational functionality of the materials handling vehicle 20 in accordance with the identification of restriction tags 32X and release tags 32R along the travel path P by the tag reader 40 and the reader module 50. The tag reader 40 and the reader module 50 further cooperate to compare identified tag data with stored tag data and initiate a remediation operation when an indicator tag 32$i$ is identified in place of a restriction tag 32X according to a sequenced portion of the stored tag data.

FIGS. 1 and 2 also illustrate the provision of additional indicator tags 32$i$ adjacent to the release tags 32R of the sequence of tags. More specifically, in FIGS. 1 and 2, each entry/exit tag set 32 comprises an additional indicator tag 32$i$ that is positioned such that the release tag 32R is positioned between the restriction tag 32X and the additional indicator tag 32$i$ along the travel path P. The tag reader 40 and the reader module 50 further cooperate to compare identified tag data with stored tag data and initiate the aforementioned remediation operation when an additional indicator tag 32$i$ is identified in place of a release tag 32R according to a sequenced portion of the stored tag data, when an additional indicator tag 32$i$ is identified out of sequence in the stored tag data, or when an additional indicator tag 32$i$ is identified in direct sequence after a restriction tag 32X is identified in the stored tag data.

It is contemplated that the aforementioned remediation operation may be initiated, for example, when an indicator tag 32$i$ is identified out of sequence in the stored tag data. Alternatively, in another contemplated embodiment, the remediation operation is initiated when an indicator tag 32$i$ is identified in direct sequence after a release tag 32R is identified in the stored tag data when a materials handling vehicle 20 is approaching the restricted navigation zone 70. Alternatively, or additionally, the remediation operation can be initiated when an indicator tag 32$i$ is identified in direct sequence after a restriction tag 32X is identified in the stored tag data when a materials handling vehicle 20 is leaving the restricted navigation zone 70.

Although a variety of conventional or yet-to-be developed remediation operations may be practiced within the scope of the present disclosure, in one contemplated embodiment, the aforementioned remediation operation is initiated by generating a human and/or machine-readable remediation signal. In other embodiments, the remediation operation comprises a fault signal generation step, a transition to or from restricted or unrestricted operational functionality of the materials handling vehicle, or a transition to operational functionality that is based on a predicted command associated with a missing tag from the sequenced tags of the tag layout.

It is contemplated that the reader module 50 may comprise any conventional or yet-to-be developed technology for facilitating a tag read operation and may reside on the materials handling vehicle 20, in a location that is remote from the materials handling vehicle 20, or a combination thereof. It is also contemplated that the reader module 50 may comprise a tag database holding the stored tag data. Alternatively, the reader module 50 may be configured to access a tag database holding the stored tag data. Similarly, the vehicle controller 60 may comprise any conventional or yet-to-be developed technology for facilitating control of the materials handling vehicle 20 and may reside on the materials handling vehicle 20, in a location that is remote from the materials handling vehicle 20, or a combination thereof.

The restricted navigation zone 70 may be characterized by a variety of operational restrictions including, for example, vehicle speed restrictions, materials handling height restrictions, or a combination thereof. The entry/exit thresholds 72 of the restricted navigation zone 70 can be configured for two-way entry and exit, limited to one-way entry, or limited to one-way exit. For example, in the one-way travel embodiment illustrated in FIG. 3, the restricted navigation zone 70 comprises an entry threshold 72A and an exit threshold 72B along the travel path P. The sequenced tags comprise an entry tag set 32A arranged along the travel path P at the entry threshold 72A of the restricted travel zone and an exit tag set 32B arranged along the travel path at the exit threshold 72B of the restricted navigation zone 70. The entry tag set 72A comprises a restriction tag 32X and an indicator tag 32i. The exit tag set 72B comprises a release tag 32R and, optionally, an additional indicator tag 32i. The indicator tag 32i is positioned between the restriction tag 32X and the restricted navigation zone 70 along the travel path P. The restricted navigation zone 70 is positioned between the indicator tag 32i and the release tag 32R along the travel path P. The vehicle controller 60 executes restricted or unrestricted operational functionality of the materials handling vehicle in accordance with the identification of the restriction tag 32X and the release tag 32R. The tag reader 40 and the reader module 50 further cooperate to compare identified tag data with stored tag data and initiate a remediation operation when an indicator tag 32i is identified in place of a restriction tag 32X according to a sequenced portion of the stored tag data.

Figure 3:
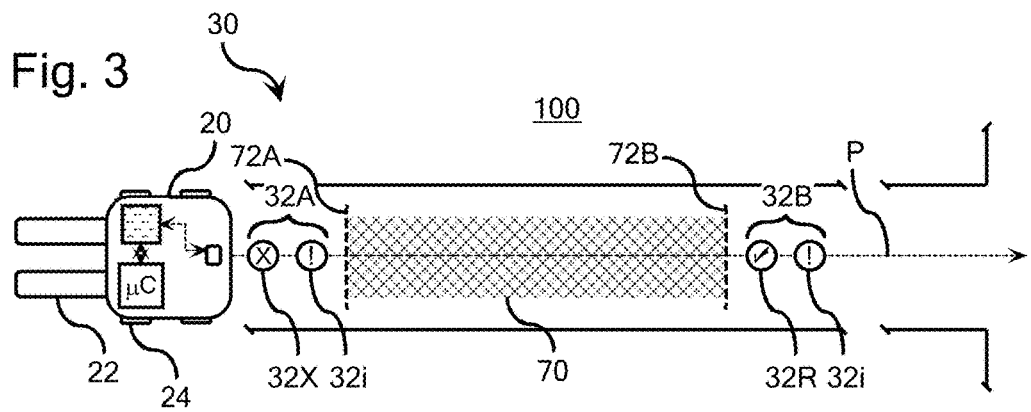

In the one-way embodiment illustrated in FIG. 3, where the exit tag set 72B is provided with the additional indicator tag 32i, i.e., where the release tag 32R is positioned between the restricted navigation zone 70 and the additional indicator tag 32i along the travel path P, the tag reader and the reader module can be configured to initiate a remediation operation when the additional indicator tag 32i is identified in place of a release tag 32R.

Figure 5:
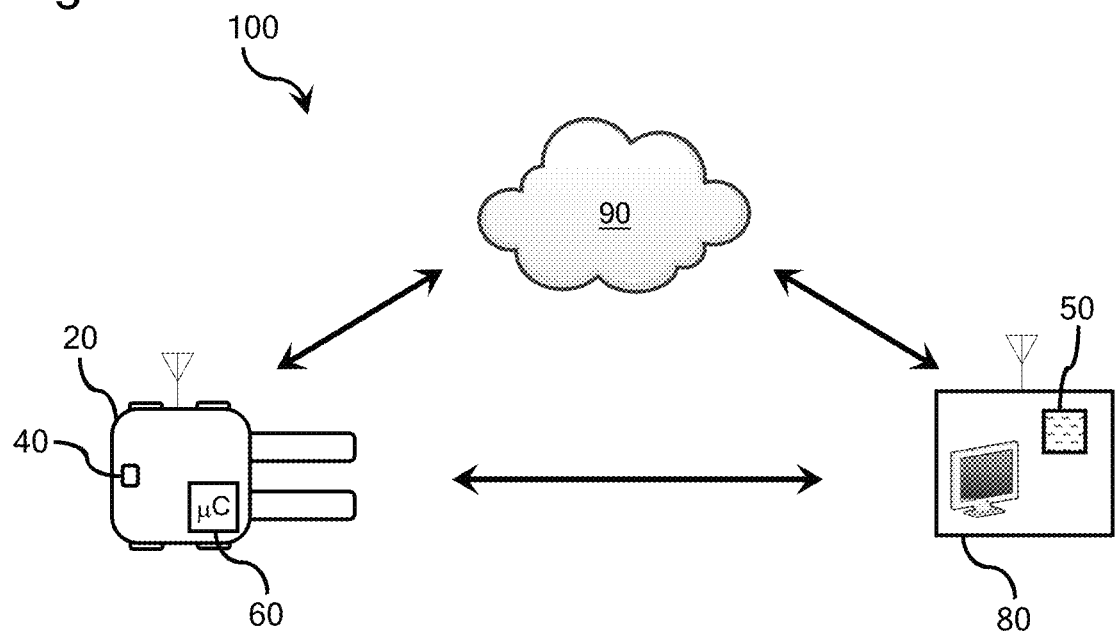
FIG. 5 illustrates materials handling vehicle operating systems configured for networked or cloud-based operation.

As previously disclosed, the tag reader 40 and the reader module 50 cooperate to compare identified tag data with stored tag data. In the embodiment illustrated in FIG. 5, where like structure is illustrated with like reference numbers, a materials handling vehicle operating system 100 according to the present disclosure is configured for networked or cloud-based operation. In FIG. 5, the reader module 50 and the stored tag data reside in a remote computer 80 that communicates with the materials handling vehicle 20 directly via a wireless network connection, indirectly via a data cloud 90, or both.

In various embodiments, a remote computer 80 may include, but need not be limited to, a desktop, laptop, server, client, tablet, smartphone, or any other type of remote computing device. In one embodiment, the remote computer 80 includes at least one processor and memory (non-volatile memory and/or volatile memory). The remote computer 80 may further include one or more input devices which can include, by way of example, any type of mouse, keyboard, disk/media drive, memory stick/thumb-drive, memory card, pen, touch-input device, biometric scanner, voice/auditory input device, motion-detector, camera, scale, etc. The remote computer 80 may include non-volatile memory (ROM, flash memory, etc.), volatile memory (RAM, etc.), or a combination thereof.

The data cloud 90 may facilitate communications over a wired network, a wide area network, a local area network, a personal area network, a cellular network, a satellite network, etc. Suitable local area networks may include wired Ethernet and/or wireless technologies such as, for example, WiFi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The data cloud 90 can be communicatively coupled to any device capable of transmitting and/or receiving data via the network. Accordingly, the hardware of the data cloud 90 can include a communication transceiver for sending and/or receiving any wired or wireless communication. For example, the data cloud 90 hardware may include an antenna, a modem, LAN port, Wi-Fi card, WiMax card, mobile communications hardware, near-field communication hardware, satellite communication hardware and/or any wired or wireless hardware for communicating with other networks and/or devices.

Figure 6:
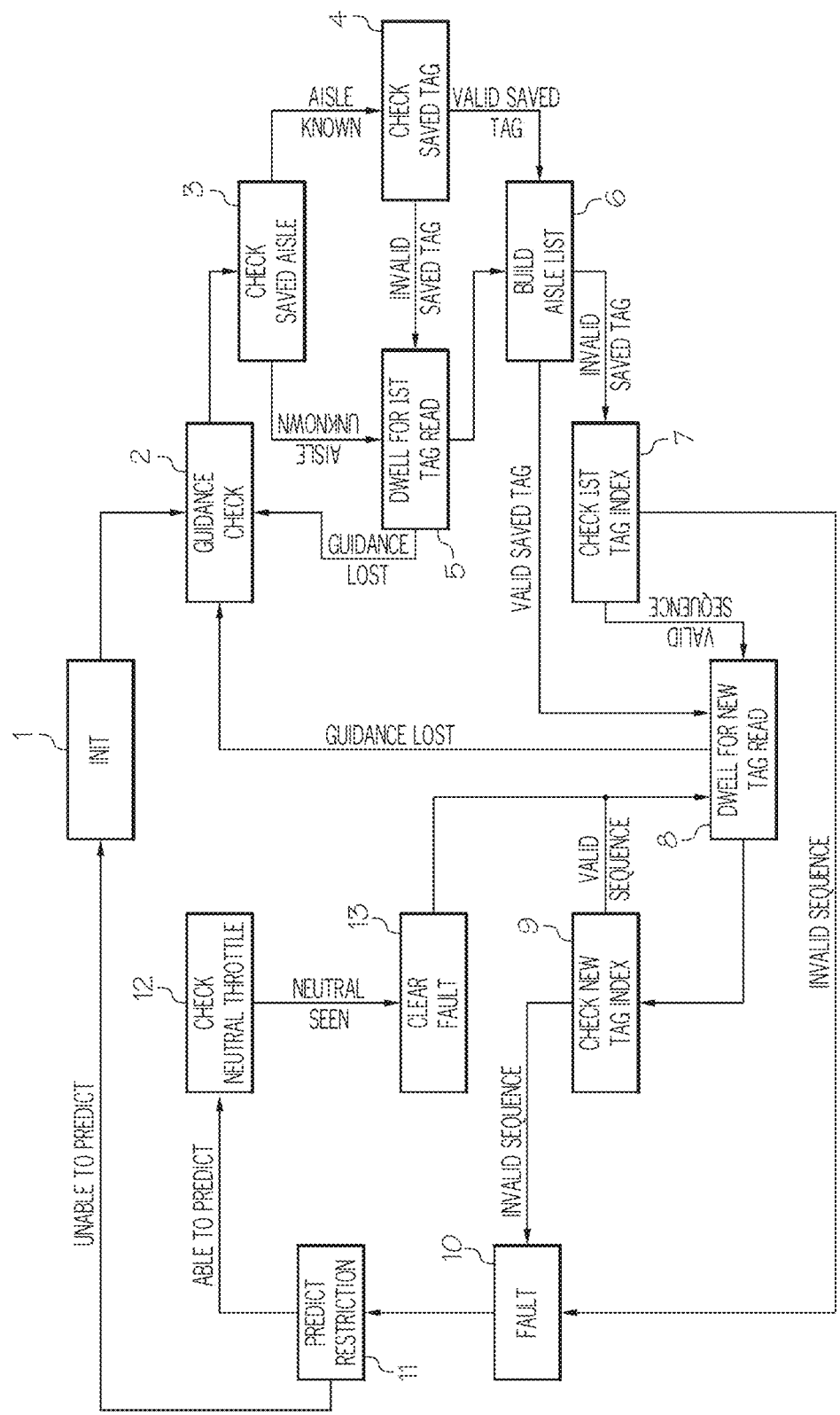
FIG. 6 is a flowchart illustrating one non-limiting example of an algorithm that can be used to incorporate remedial indicator tags into a warehouse navigation routine.

The flowchart of FIG. 6 illustrates one non-limiting example of a particular mode of operating the materials handling vehicle operating system disclosed herein. In the illustrated example, upon startup of the materials handling vehicle (see step 1), the reader module performs a guidance check (see step 2) to determine the location of the materials handling vehicle within the tag layout. This guidance check can be performed by first checking if the materials handling vehicle is in a saved aisle (see step 3). If there is a saved aisle, meaning there is an aisle in which the materials handling vehicle is known to be, with stored tag data, the reader module checks the last tag read, or the last tag data saved (see step 4), and if there is no saved aisle, the aisle location of the materials handling vehicle is unknown, or if there is no saved tag data (for instance, if the materials handling vehicle was turned off mid-aisle), the reader module will wait for the next tag read by the tag reader (see step 5). Once the tag reader reads a tag (see step 5), or if there was tag data saved (see step 4), the algorithm builds an aisle list with a sequenced portion of stored tag data (see step 6). The aisle list compiles a sequenced portion of the stored tag data for the tag layout. If the saved tag data is valid, or is found, within the aisle list, the reader module waits for the tag reader to read a new tag (see step 8). If the saved tag is invalid, or is not found, within the aisle list, the reader module checks that the sequenced portion of the stored tag data for the tag layout is correct by checking the tag index, or stored tag data for the tag layout (see step 7). If it is a valid sequence, the reader module waits for the tag reader to read a new tag (see step 8). If it is an invalid sequence, the tag reader and the reader module initiate a remediation operation, which may include generating a fault signal (see step 10). This invalid sequence may be due to a tag missing or malfunctioning.

After waiting for the tag reader to read a new tag (see step 8), the reader module checks the new tag data by checking the tag index, or stored tag data for the tag layout (see step 9). If the new tag data is a valid sequence when checked against the stored tag data, the reader module will wait for the tag reader to read a new tag (see step 8). This loop may continue indefinitely as long as there are no tags missing or malfunctioning. After the reader module initiates a remediation operation (see step 10) from an invalid sequence, the reader modules module compares the tag data from the last valid tag read to the stored tag data and predicts the operational functionality command of the missing tag from the sequenced portion of the stored tag data (see step 11). If the reader module is unable to predict the command, the materials handling vehicle restarts (see step 1). If the reader module is able to predict the operational functionality command, a user may place the materials handling vehicle's throttle in a neutral position (see step 12), or may perform another mechanism, before the materials handling vehicle achieves movement again. The reader module then clears the fault (see step 13).

In some cases, the reader module may predict the operational functionality command (see step 11) and end the remediation operation (which may include clearing the fault signal generated, see step 13) without interfering with operation of the materials handling vehicle. After the reader module ends the remediation operation (see step 13), it then waits for the tag reader to read a new tag (see step 8). If guidance is ever lost while waiting for the tag reader to read a new tag (see steps 8 or 5), the reader module performs a guidance check (see step 2).

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle operating system comprising a materials handling vehicle, a tag layout, and a tag reader residing on the materials handling vehicle, wherein:
   the materials handling vehicle comprises storage and retrieval hardware and a vehicle drive mechanism;
   the tag layout comprises a plurality of sequenced tags positioned along a travel path comprising a restricted navigation zone;
   the sequenced tags comprise a plurality of entry/exit tag sets arranged along the travel path;
   each entry/exit tag set of the plurality of entry/exit tag sets comprises a release tag, a restriction tag, and an indicator tag;
   the indicator tag is positioned between the restriction tag and the restricted navigation zone along the travel path; and
   the restriction tag is positioned between the release tag and the indicator tag along the travel path.

2. The system of claim 1 wherein the remediation operation is initiated when an indicator tag is identified out of sequence in the stored tag data.

3. The system of claim 1 wherein the remediation operation is initiated when:
   an indicator tag is identified in direct sequence after a release tag is identified in the stored tag data and the materials handling vehicle is approaching the restricted navigation zone;
   an indicator tag is identified in direct sequence after a restriction tag is identified in the stored tag data and the materials handling vehicle is leaving the restricted navigation zone; or
   both.

4. The system of claim 1 wherein:
   each entry/exit tag set of the plurality of entry/exit tag sets further comprises an additional indicator tag; and
   the release tag is positioned between the restriction tag and the additional indicator tag along the travel path.

5. The system of claim 1 wherein the remediation operation is initiated when an additional indicator tag is identified out of sequence in the stored tag data.

6. The system of claim 1 wherein the remediation operation is initiated when an additional indicator tag is identified in direct sequence after a restriction tag is identified in the stored tag data.

7. The system of claim 1 wherein the remediation operation is initiated by generating a remediation signal.

8. The system of claim 1 wherein the remediation operation comprises a fault signal generation step.

9. The system of claim 1 wherein the remediation operation comprises a transition to or from restricted or unrestricted operational functionality of the materials handling vehicle.

10. The system of claim 1 wherein the remediation operation comprises a transition to operational functionality that is based on a predicted command associated with a missing tag from the sequenced tags of the tag layout.

11. The system of claim 1 wherein the restricted navigation zone is characterized by vehicle speed restrictions, materials handling height restrictions, or a combination thereof.

12. The system of claim 1 wherein the sequenced tags comprise RFID tags.

13. The system of claim 1 wherein the sequenced tags are distinguishable only by tag identification data.

14. The system of claim 1 wherein the sequenced tags are configured to provide identification data to the tag reader passively or actively.

15. A materials handling vehicle operating system comprising a materials handling vehicle, a tag layout, and a tag reader residing on the materials handling vehicle, wherein:
    the materials handling vehicle comprises storage and retrieval hardware and a vehicle drive mechanism;
    the tag layout comprises a plurality of sequenced tags positioned along a travel path comprising a restricted navigation zone;
    the sequenced tags comprises an entry tag set and an exit tag set;
    the entry tag set comprises a restriction tag and an indicator tag;
    the exit tag set comprises a release tag;
    the indicator tag is positioned between the restriction tag and the restricted navigation zone along the travel path; and
    the restricted navigation zone is positioned between the indicator tag and the release tag along the travel path.

16. The system of claim 15 wherein:
    the exit tag set comprises the release tag and an additional indicator tag; and
    the release tag is positioned between the restricted navigation zone and the additional indicator tag along the travel path.

17. A materials handling vehicle tag layout comprising a plurality of sequenced tags positioned along a travel path comprising a restricted navigation zone, wherein:
    the sequenced tags comprise a plurality of entry/exit tag sets arranged along the travel path;
    each entry/exit tag set of the plurality of entry/exit tag sets comprises a release tag, a restriction tag, and an indicator tag;
    the indicator tag is positioned between the restriction tag and the restricted navigation zone along the travel path; and
    the restriction tag is positioned between the release tag and the indicator tag along the travel path.

18. The tag layout of claim 17 wherein:
    each entry/exit tag set of the plurality of entry/exit tag sets further comprises an additional indicator tag; and the release tag is positioned between the restriction tag and the additional indicator tag along the travel path.

19. A materials handling vehicle tag layout comprising a plurality of sequenced tags positioned along a travel path comprising a restricted navigation zone, wherein:
the sequenced tags comprises an entry tag set arranged along the travel path;
the entry tag set comprises a restriction tag and an indicator tag;
the exit tag set comprises a release tag;
the indicator tag is positioned between the restriction tag and the restricted navigation zone along the travel path; and
the restricted navigation zone is positioned between the indicator tag and the release tag along the travel path.

20. The tag layout of claim 19 wherein:
the exit tag set comprises the release tag and an additional indicator tag; and
the release tag is positioned between the restricted navigation zone and the additional indicator tag along the travel path.

21. A materials handling vehicle operating system comprising a materials handling vehicle, a tag layout, a tag database, and a tag reader residing on the materials handling vehicle, wherein:
the materials handling vehicle comprises storage and retrieval hardware and a vehicle drive mechanism;
the tag layout comprises a plurality of sequenced tags positioned along a travel path comprising a restricted navigation zone;
the sequenced tags comprise a plurality of entry/exit tag sets arranged along the travel path;
each entry/exit tag set of the plurality of entry/exit tag sets comprises a release tag, a restriction tag, and an indicator tag;
the tag database holds stored tag data identifying the release tag, the restriction tag, and the indicator tag;
the indicator tag is positioned between the restriction tag and the restricted navigation zone along the travel path; and
the restriction tag is positioned between the release tag and the indicator tag along the travel path.

\* \* \* \* \*